United States Patent
Herrera-Morales et al.

(10) Patent No.: US 9,937,793 B2
(45) Date of Patent: Apr. 10, 2018

(54) THREE DIMENSIONAL VIEW INTERACTIVE ACTIVATION SYSTEM TO DEPLOY INFORMATION

(71) Applicant: Continental Automotive Systems, Inc., Auburn Hills, MI (US)

(72) Inventors: Oscar Herrera-Morales, Tlaquepaque (MX); Luis Gutierrez-Valdez, Tlaquepaque (MX); Hiram Aburto-Crespo, Tlaquepaque (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 434 days.

(21) Appl. No.: 14/502,402

(22) Filed: Sep. 30, 2014

(65) Prior Publication Data

US 2016/0089977 A1    Mar. 31, 2016

(51) Int. Cl.
| | | |
|---|---|---|
| *B60K 35/00* | (2006.01) | |
| *B60K 37/06* | (2006.01) | |
| *G06F 1/16* | (2006.01) | |
| *G06F 3/01* | (2006.01) | |
| *G06F 3/041* | (2006.01) | |

(52) U.S. Cl.
CPC .............. *B60K 35/00* (2013.01); *B60K 37/06* (2013.01); *B60K 2350/1032* (2013.01); *B60K 2350/1056* (2013.01); *B60K 2350/2017* (2013.01); *B60K 2350/2026* (2013.01); *B60K 2350/2052* (2013.01); *G06F 1/1639* (2013.01); *G06F 3/017* (2013.01); *G06F 3/0412* (2013.01); *G06F 2203/04102* (2013.01)

(58) Field of Classification Search
CPC .... G06F 3/04883; G06F 1/163; G06F 1/1643; G06F 3/011; G06F 3/013; G06F 3/04842; G06F 3/04886; G02B 5/32
See application file for complete search history.

(56) References Cited

U.S. PATENT DOCUMENTS

| | | | |
|---|---|---|---|
| 8,514,194 B2* | 8/2013 | Lawrence | G03H 1/0005 345/173 |
| 2007/0176909 A1* | 8/2007 | Pavlowski | G06F 3/03545 345/179 |
| 2014/0104577 A1* | 4/2014 | Kaneda | G02B 27/2292 353/7 |

* cited by examiner

*Primary Examiner* — Jennifer Mehmood
*Assistant Examiner* — Parul Gupta

(57) ABSTRACT

An interactive activation system having a base with a display module that projects two or more icons. The display module is connected to the base. A case is connected to the base and covers the display output module. The case has one or more apertures that aligned with the display output module in a manner that allows the two or more icons to be projected through the one or more apertures. An output screen is connected to the case and has at least one reflective surface that is positioned relative to the one or more apertures of the case. This allows the two or more icons projected by the display output module to be reflected by the reflective surface of the output screen toward a viewing zone.

15 Claims, 3 Drawing Sheets

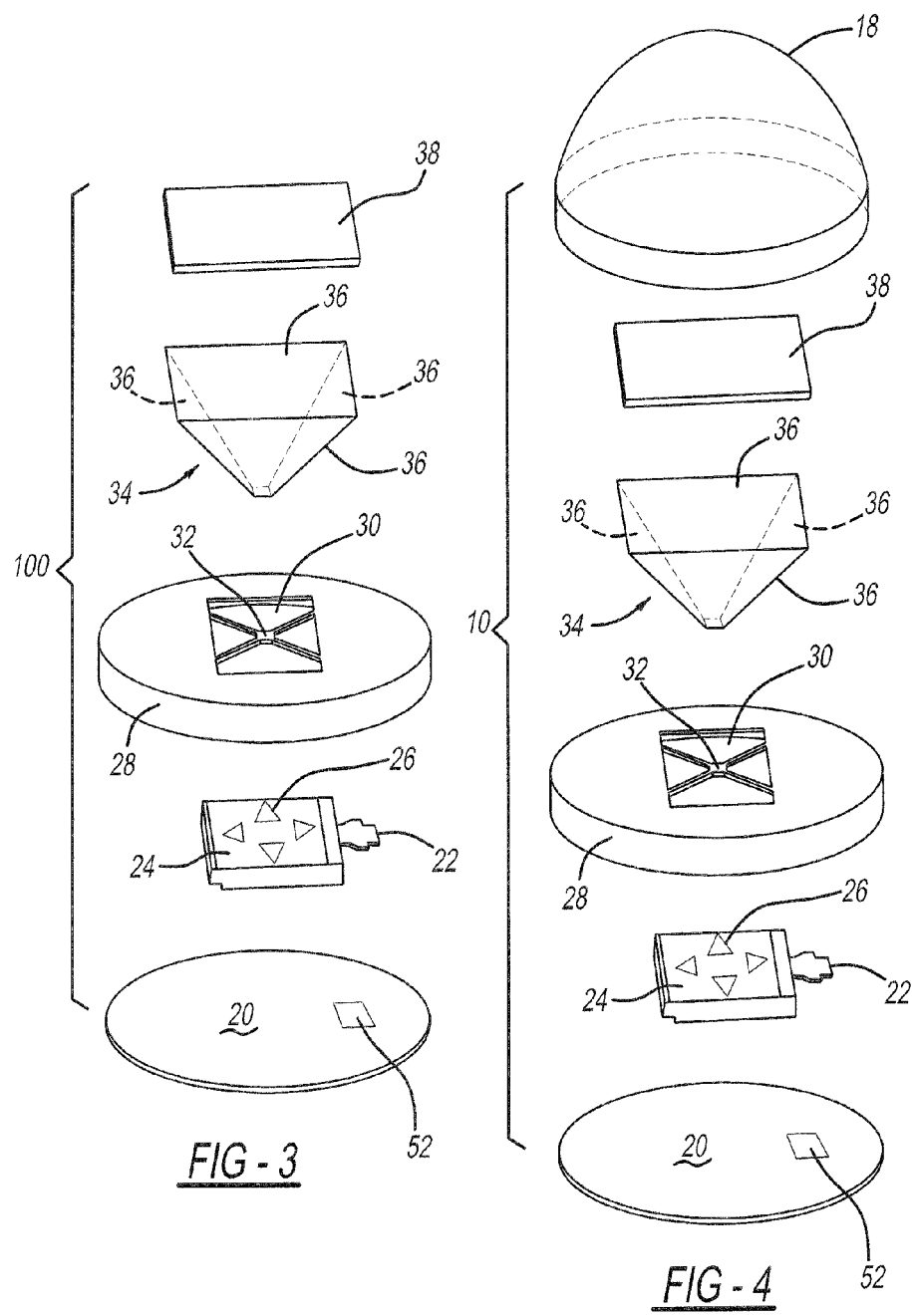

THREE DIMENSIONAL VIEW INTERACTIVE ACTIVATION SYSTEM TO DEPLOY INFORMATION

FIELD OF THE INVENTION

The present invention relates to a vehicle interactive activation system employing three-dimensional holographic imaging.

BACKGROUND OF THE INVENTION

In current motor vehicles, physical functions of a vehicle, such as turning the radio on and off, interacting with in-vehicle media systems, opening a vehicle hood, turning on and off lights, signals, wipers, mist features, headlights, and parking brakes all require movement of different components in the vehicle. All the various functions have individual components have different sensors and interfaces, which add different components to the vehicle. In particular, the radio and media center often have several different buttons or confusing screens and menus for operating an in-vehicle media system. Such devices can be distracting to a driver as well as other persons in the vehicle. It is desirable to simplify vehicle functions and vehicle media centers for drivers and passengers in a vehicle. It is further desirable to reduce the number of interfaces in a vehicle, but still provide the same number of mechanical functions with relatively little modification of current vehicle designs. It is also desirable to provide a practical driver interface that does not necessarily require a driver or user to pull levers or push buttons. It is further desirable to provide a touch free activation system that will allow a user to scroll through and select or issue commands from a single device, which will be directed to several different components of a vehicle.

SUMMARY OF THE INVENTION

The present invention is directed to an interactive activation system having a base with a display module that projects two or more icons. The display module is connected to the base. A case is connected to the base and covers the display output module. The case has one or more apertures that aligned with the display output module in a manner that allows the two or more icons to be projected through the one or more apertures to an output screen. The output screen is connected to the case and has at least one reflective surface that is positioned relative to the one or more apertures of the case and allows the two or more icons projected by the display output module to be reflected by the reflective surface of the output screen toward a viewing zone. The interactive activation system further includes an interaction device having one or more sensors allowing a user to send one or more command signals to the interactive activation system. The one or more command signals cause the display output module to display and arrange the two or more icons within the viewing zone, in response to the one or more command signals provided by the user. The interactive activation device also allows the user to send one or more action signals to various systems of the vehicle upon selection of one of the one or more icons viewed by the user.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is an exploded side perspective view of the interactive activation system of an alternate embodiment of the invention;

FIG. 4 is an exploded side perspective view of the interactive activation system of FIG. 2;

DETAILED DESCRIPTION OF THE PREFERRED EMBODIMENTS

The following description of the preferred embodiment(s) is merely exemplary in nature and is in no way intended to limit the invention, its application, or uses.

Figure 1:
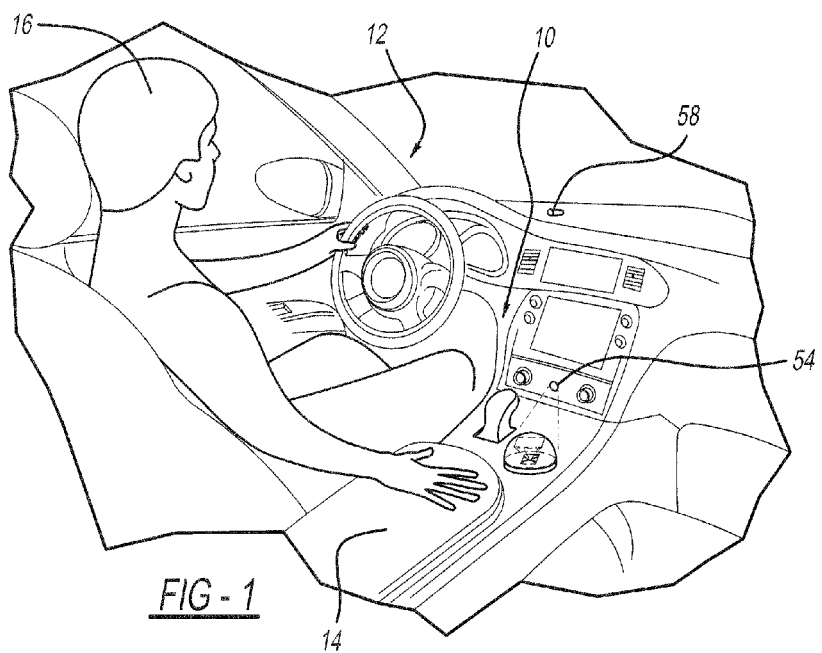
FIG. 1 is an illustrated view of the interactive activation system and operation within an interior of a vehicle.

Referring now to all the figures, with particular reference to FIG. 1, an interactive activation system 10 is shown connected to a vehicle 12. As shown in FIG. 1, the interactive activation system 10 is connected to a center counsel 14 on an interior compartment of a vehicle so that the interactive activation system 10 can be easily operated by a user 16. It is within the scope of this invention for the interactive activation system 10 to be connected to other areas such as the instrument panel or other areas within operating range of the user 16.

Referring briefly to FIGS. 3 and 4, exploded views of the interactive activation systems are shown. In particular, FIG. 3 shows the interactive activation system 100 in accordance with one embodiment of the invention, while FIG. 4 shows an interactive activation system 10 in accordance with a second or preferred embodiment of the invention. The only difference between the preferred embodiment of the invention shown in FIG. 4 and the embodiment shown in FIG. 3 is that a cover 18 is not present in the embodiment shown in FIG. 3; therefore, identical reference numerals showing like parts are shown in both FIGS. 3 and 4.

The interactive activation system 10, 100 shown in FIGS. 3 and 4 include a printed circuit board (PCB) 20 which contains a controller 52, electrical leads and other connections necessary for operating the interactive activation system. A display output module 22 is connected to the interactive activation system and includes a projection screen 24 capable of projecting two or more icons 26 from the projection screen 24. The projection screen 24 may be a light emitting diode display, liquid crystal display, or other graphical display capable of projecting the two or more icons 26 from the projection screen 24.

A case 28 of the interactive activation system 10 connects to and covers the printed circuit board 20 and display output module 22. The case 28 has two or more apertures 30. As shown in FIGS. 3 and 4, there are a total of four apertures;

however, it is within the scope of this invention for a greater or lesser number of apertures to be present.

When the interactive activation system 10, 100 is assembled, the projection screen 24 of the display output module 22 is aligned with the apertures 30 of the case 28 such that the icons 26 are projected from the projection screen 24 through individual or specific apertures 30. It is also within the scope of this invention for multiple icons to be displayed within a single aperture 30; for example, if a menu showing several options or selections were to be displayed, then multiple icons would be projected through a single one of the apertures 30 of the case 28.

Located in the center of the case 28 is a stand 32 that is used to align and support an output screen 34. In the present invention, the output screen 34 has reflective surfaces 36, which as shown in FIGS. 3 and 4 are four sides and the output screen 34 has an upside down pyramid shape, where the tip of the pyramid makes contact with and is supported by the stand 32. It is within the scope of this invention for the output screen 34 to be other shapes such as spherical, cylindrical, square or rectangular cube shaped dome. In the present embodiment of the invention shown in FIGS. 3 and 4, the output screen 34 is pyramidal shaped and further includes a base 38 that is solid and does not serve as a reflective surface. However, in an optional embodiment of the invention shown in FIG. 2, a projection base 40 is used, which is a flat surface or screen where two or more icons 26 can be projected through an aperture 42 located in the stand 32. In order to project the icon images through the aperture 42, a lens may be located at the aperture 42 to broaden the projection angel through the aperture 42.

FIG. 4, as stated above, further includes a cover 18, which is shown to be a clear dome that connects to the case 28 and circumscribes the perimeter of the case 28 and output screen 34. The cover 18, as shown may be one selected from the group consisting of a spherical cover, cylindrical cover, square or rectangular cube shaped dome.

Figure 2:
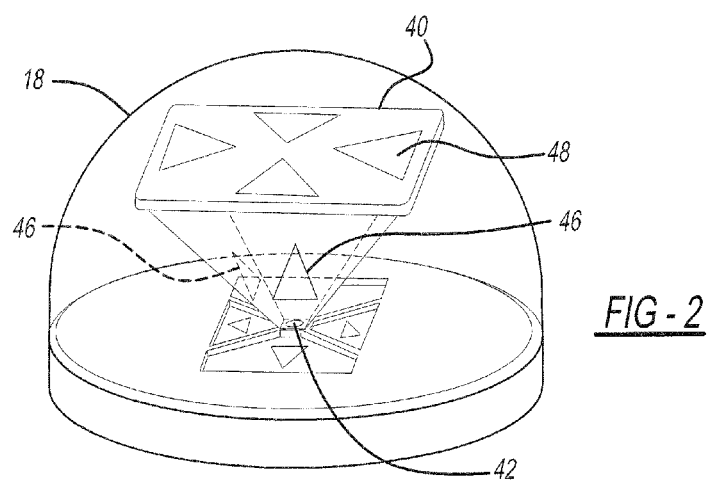
FIG. 2 is a side perspective view of the interactive activation system in accordance with one embodiment of the present invention.
Figure 5:
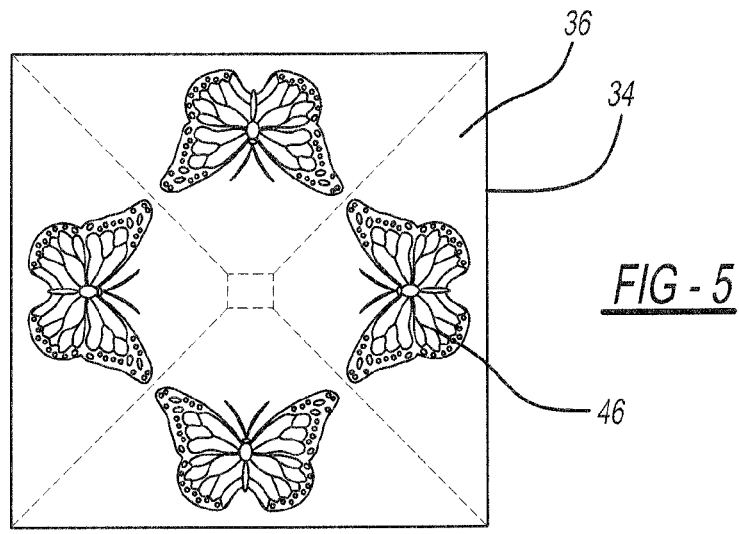
FIG. 5 is a top view of the assembled interactive activation system of FIG. 3.
Figure 6:
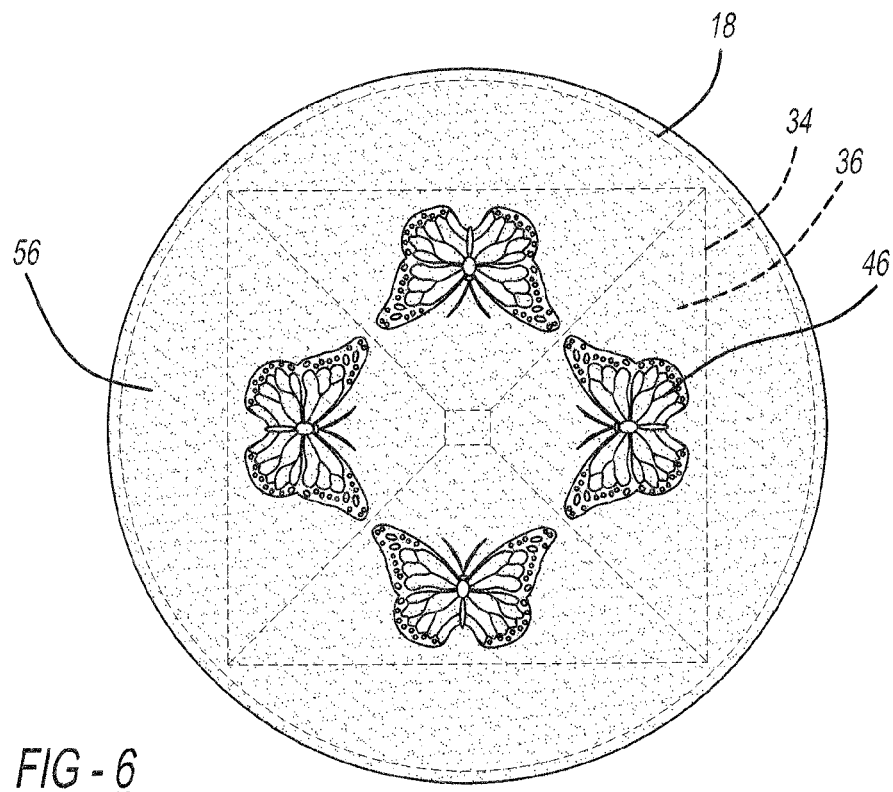
FIG. 6 is a top view of the interactive activation system of FIG. 2.

Referring now to FIGS. 2, 5, and 6, the projection of icons 26 from the projection screen 24 to the reflective surface 36 or projection base 40 is shown and described. The two or more icons 26 are projected from the projection screen 24 of the display output module 22, through the apertures 30 in the case 28. In the case of FIG. 2, additional projection of the icons is made through the aperture 42 in the stand of the case 28 and projects through the output screen 34 to the projection base 40. When the icons 26 reach the reflective surfaces 36 of the output screen 34, the image projected is inverted and they are reflected icons 46 that can be seen from a viewing zone 44 which is defined to be an area that the user 16 can see the two or more reflected icons 46 located on one of the reflective surfaces 36 or projected icons 48 on the surface of the projection base 40. In the embodiment shown in FIG. 2, the projected icons 48 are not inverted, but rather are magnified views of the icons that are projected through the aperture 42. The display output module 22 does not need to invert the icons in order to ensure that the projected icons 48 are in the correct orientation.

In order for the user 16 to interact with the interactive activation system 10, an interaction device 50 is implemented and includes a controller 52, which is shown as connected to the PCB 20 but can be located anywhere in the vehicle, connected to one or more sensors 54 that allow the user 16 to send one or more command signals to the display output module 22, so that the display output module will display and arrange the two or more icons 26 within the viewing zone 44 in response to the command signals. The interaction device also allows the user to send two or more action signals to at least one vehicle sub-system upon selection of one of the two or more reflected icons 46 selected by the user 16.

As shown in FIG. 6, in order to determine when a user 16 sends a command signal or action signal, the interaction device uses one or more sensors 54 that include either a touch sensor, which can be a clear touch sensitive film layer 56 connected to the cover 18, that is capable of sensing when and where the user 16 touches the film layer 56. Upon touching the film layer 56, a signal will be sent to the controller 52 where the signal is then analyzed and processed as either a command signal or action signal.

It is also within the scope of this invention for touchless sensors to be used. FIG. 1 shows an example of a touchless sensor 54 which is a Kinnect® camera that views the cover 18 and the hand of the user 16 and detects when the hand movements of the user 16 are seeking to interact with the reflected icons 46 or projected icons 48 in the viewing zone 44. This particular type of touchless sensor system interprets the hand movements of the user and determines when the user is seeking to send command or action signals. The touchless sensor 54 is shown as being mounted to the instrument panel of a vehicle; however, it is within the scope of this invention for the touchless sensor to be connected to the case 28. Other touchless sensor systems that can be used include a leap Motion® system, a charge couple device, infrared sensors, digital camera, motion detectors, voice activation system including a microphone, or combinations thereof. Regarding a voice operated touchless sensor system, FIG. 1 also shows the location of a microphone 58 that is connected to the controller 52 may be used to send signals to the controller that are then analyzed and interpreted to be command or action signals.

The types of action signals generated by the controller 52 include signals that pertain to one or more vehicle functions including, but not necessarily limited to, clock, e-mail, video, dvd controls, radio controls, acceleration, braking, parking brake on, parking brake release, door lock, door unlock, window actuators, door actuators, hood release switch, fuel door release switch, telephone controls, navigation controls, interior light controls, exterior light controls, cruise controls, satellite radio controls, turn signal controls, hazard signal controls, odometer controls, vehicle information center controls, infotainment center controls, window wiper controls, and combinations thereof. The command signals that can be generated by the interactive activation system allow the user 16 to cause the two or more reflected icons 46 or projected icons 48 to be moved within or removed from the viewing zone 44, thereby allowing the user 16 to scroll through the various icons, which can then be selected and used to generate the various action signals described above.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An interactive activation system comprising:
 a base having a display output module connected to the base where the display output module projects two or more icons;
 a case connected to the base, the case has one or more apertures aligned with the display output module so that the two or more icons are projected through each of the one or more apertures;

a circuit board, which is covered by the case and which supports a controller;

an output screen connected to the case and having at least one reflective surface, wherein the at least one reflective surface is positioned relative to the one or more apertures of the case so that the two or more icons projected by the display output module are reflected by the at least one reflective surface toward a viewing zone and will be visible as two or more reflected icons; and an interaction device coupled to the controller and having one or more sensors allowing a user to send two or more command signals to the display output module to display and arrange the two or more reflected icons within the viewing zone in response to the two or more command signals and the interaction device allows the user to send two or more action signals to at least one vehicle sub-systems upon selection of one of the two or more reflected icons selected by the user;

a voice operated sensor connected to the controller and configured to send signals to the controller, the signals sent to the controller being at least one of: a command signal and an action signal; and a cover connected to the case and partially surrounding the output screen where the two or more reflected icons in the viewing zone are viewable through the case.

2. The interactive activation system of claim 1, wherein the two or more reflected icons can be moved within or removed from the viewing zone by one of the two or more command signals, allowing the user to scroll through the two or more icons.

3. The interactive activation system of claim 2, wherein the two or more reflected icons when selected generate one of the two or more action signals for controlling one or more of the following vehicle functions selected from the group consisting of:

clock, e-mail, video, dvd controls, radio controls, acceleration, braking, parking brake on, parking brake release, door lock, door unlock, window actuators, door actuators, hood release switch, fuel door release switch, telephone controls, navigation controls, interior light controls, exterior light controls, cruise controls, satellite radio controls, turn signal controls, hazard signal controls, odometer controls, vehicle information center controls, infotainment controls, window wiper controls, and combinations thereof.

4. The interactive activation system of claim 1, wherein the cover is one selected from the group consisting of a spherical cover, cylinder cover, square or rectangle cube shaped dome.

5. The interactive activation system of claim 1, wherein the interaction device includes one or more touchless sensors connected to the case or at a location within the sight distance from the viewing zone.

6. The interactive activation system of claim 5, wherein the one or more touchless sensors are one selected from the group consisting of a charge couple device, infrared sensors, digital camera, motion detectors, voice activation system including a microphone, or combinations thereof.

7. The interactive activation system of claim 1, wherein the cover further includes a touch sensor film connected to the cover, wherein the user can send the one or more command signals or the one or more action signals by touching the cover.

8. An interactive activation system comprising:

a base having a display output module where the display output module is connected to the base and projects two or more icons;

a case connected to the base, the case having two or more apertures aligned with the display output module so that the two or more icons are projected through each one of the two or more apertures;

a circuit board, which is covered by the case and which supports a controller;

an inverted pyramidal shaped output screen connected to and supported by the circuit board, and connected to the case, the inverted pyramidal shaped output screen having two or more reflective surfaces, wherein the two or more reflective surfaces are positioned relative to the two or more apertures of the case so that the two or more icons projected by the display output module are reflected by the two or more reflective surfaces toward a viewing zone and will be visible as two or more reflected icons;

a dome shaped cover connected to the case and partially surrounding the inverted pyramid output screen where the two or icons in the viewing zone are viewable through the dome shaped case;

an interaction device having one or more sensors allowing a user to send two or more command signals to the display output module to display and arrange the two or more icons within the viewing zone in response to the two or more command signals and the interaction device allows the user to send one or more action signals to at least one vehicle sub-system upon selection of one of the two or more icons viewed by the user;

a voice operated sensor connected to the controller and configured to send signals to the controller, the signals sent to the controller being at least one of: a command signal and an action signal; and a cover connected to the case and partially surrounding the output screen where the two or more reflected icons in the viewing zone are viewable through the case.

9. The interactive activation system of claim 8, wherein the two or more reflected icons can be moved within or removed from the viewing zone by one of the two or more commands, allowing the user to scroll through the two or more reflected icons.

10. The interactive activation system of claim 9, wherein the two or more reflected icons when selected generate one of the two or more action signals for controlling one or more of the following vehicle functions selected from the group consisting of:

clock, e-mail, video, dvd controls, radio controls, acceleration, braking, parking brake on, parking brake release, door lock, door unlock, window actuators, door actuators, hood release switch, fuel door release switch, telephone controls, navigation controls, interior light controls, exterior light controls, cruise controls, satellite radio controls, turn signal controls, hazard signal controls, odometer controls, vehicle information center controls, window wiper controls, and combinations thereof.

11. The interactive activation system of claim 8, wherein the two or more reflected icons can be moved within or removed from the viewing zone by one of the two or more command signals, allowing the user to scroll through the two or more icons.

12. The interactive activation system of claim 8, wherein the cover is one selected from the group consisting of a spherical cover, cylinder cover, square or rectangle cube shaped dome.

13. The interactive activation system of claim 8, wherein the interaction device includes one or more touchless sensors connected to the case or at a location within the sight distance from the viewing zone.

14. The interactive activation system of claim 8, wherein the one or more touchless sensors are one selected from the group consisting of a charge couple device, infrared sensors, digital camera, motion detectors, voice activation system including a microphone, or combinations thereof.

15. The interactive activation system of claim 8, wherein the cover further includes a touch sensor film connected to the cover, wherein the user can send the one or more command signals or the one or more action signals by touching the cover.

\* \* \* \* \*